United States Patent [19]

Lawson et al.

[11] Patent Number: 5,421,291

[45] Date of Patent: * Jun. 6, 1995

[54] ANIMAL LITTER CONTAINING A WATER-SWELLABLE CLAY, CARBOXYMETHYLCELLULOSE, AND SILICEOUS COATED BICARBONATE PARTICLES

[75] Inventors: Frederick W. Lawson; Robert M. Wendell, both of Somerville, N.J.

[73] Assignee: Church & Dwight Co., Inc., Princeton, N.J.

[*] Notice: The portion of the term of this patent subsequent to Apr. 19, 2011 has been disclaimed.

[21] Appl. No.: 218,749

[22] Filed: Mar. 28, 1994

[51] Int. Cl.$^6$ ............................................. A01K 1/015
[52] U.S. Cl. ................................................... 119/173
[58] Field of Search ........................ 119/171, 172, 173

[56] References Cited

U.S. PATENT DOCUMENTS

| | | |
|---|---|---|
| 3,765,371 | 10/1973 | Fisher . |
| 4,275,684 | 6/1981 | Kramer et al. . |
| 4,315,761 | 2/1982 | Larrson et al. ............................ 71/21 |
| 4,341,180 | 7/1982 | Cortigene et al. .................. 119/173 |
| 4,395,357 | 7/1983 | Kramer et al. ...................... 252/428 |
| 4,494,481 | 1/1985 | Rodriguez et al. . |
| 4,570,573 | 2/1986 | Lohman . |
| 4,607,594 | 8/1986 | Thacker ............................... 119/171 |
| 4,638,763 | 1/1987 | Greenberg . |
| 4,657,881 | 4/1987 | Crampton et al. .................. 119/173 |
| 4,685,420 | 8/1987 | Stuart . |
| 4,685,907 | 8/1987 | Agren et al. . |
| 4,816,254 | 3/1989 | Moss . |
| 5,000,115 | 3/1991 | Hughes ............................... 119/173 |
| 5,014,650 | 5/1991 | Sowle et al. ........................ 119/171 |
| 5,101,771 | 4/1992 | Goss .................................... 119/173 |
| 5,176,107 | 1/1993 | Buschur ............................... 119/172 |

FOREIGN PATENT DOCUMENTS

| | | | |
|---|---|---|---|
| 239932 | 10/1987 | Japan ................................... 119/173 |
| 2092223 | 4/1990 | Spain .................................. 119/171 |
| 9105464 | 5/1991 | WIPO ................................. 119/173 |

*Primary Examiner*—Todd E. Manahan
*Attorney, Agent, or Firm*—Charles B. Barris

[57] ABSTRACT

There is disclosed an animal litter composition comprising 1) a particulate, water absorbent clayey component, e.g., sodium bentonite, containing at least one water-swellable clay mineral, e.g. montmorillonite; 2) a water-soluble salt, e.g., a sodium salt of a carboxymethylcellulose; and optionally (3) a solid particulate deodorizing additive component comprising sodium bicarbonate (SBC) or potassium bicarbonate (KBC), the particles of which are substantially coated with a mineral oil, mixed with a powdered siliceous material, e.g., expanded perlite, having a bulk density significantly lower than the density of SBC or KBC, the coated particles of SBC or KBC being stably adhered to and agglomerated with the particles of the siliceous material. On contact with a waste aqueous liquid such as urine, the litter composition forms clumps which can be easily removed from the remainder of the litter and can be disposed of with relatively little disintegration.

22 Claims, No Drawings

ANIMAL LITTER CONTAINING A WATER-SWELLABLE CLAY, CARBOXYMETHYLCELLULOSE, AND SILICEOUS COATED BICARBONATE PARTICLES

BACKGROUND OF THE INVENTION

1. Field of the Invention

This invention relates to novel clumpable animal litters.

2. Information Disclosure Statement including Description of Related Art

The following information is disclosed in accordance with the provisions of 37 CFR 1.56, 1.97 and 1.98.

As is well-known, many species of animals and birds are raised and/or kept by people for various purposes, e.g., as pets; for the production of valuable products such as food or furs; or for experimental purposes. A major problem connected with the raising and/or keeping of animals is the disposition of their waste excretions, mainly urine and feces. Whether the animal or bird is caged, in which case its waste is deposited on the floor of the cage, or allowed to roam free but is trained to deposit its waste in a particular receptacle, a "litter" material is generally employed which is capable of absorbing the liquid portion of waste excretions, primarily urine and the excess liquid of fecal matter.

Of particular interest as the basic component of animal litters are the clayey soils or comminuted rocks, e.g. the sodium bentonites, comprising at least one water-swellable clay mineral in the montmorillonite clay family, since these materials have the ability to clump and harden after contact with an aqueous liquid such as urine. This facilitates the removal of only the soiled portion of the litter in a litter box or cage during cleaning without the necessity of removing all the litter. However, while the water absorption properties of litters based on water-swellable clay make them more effective in reducing the mess of animal waste excretions between cleanings, due to the tendency of the clay to form clumps, it has been found that such clumps often tend to disintegrate before proper disposal. This decreases the effectiveness of the cleaning process.

With regard to the odor problem connected with the use of animal litters, various deodorizing agents have been recommended for use in such litters, including sodium bicarbonate (SBC). However, when SBC is utilized in the form of an unmodified powder as a deodorizing agent in animal litter, it tends to "wick" and dissolve in the aqueous phase of any animal waste products present, in which dissolved state it does not exert any deodorizing effect. Furthermore, due to its relatively high density, it tends to sink to the bottom of any litter composition present in the cage or litter box. To overcome these disadvantages, it has been proposed that the SBC be utilized in the animal litter in encapsulated form. However, the preparation of encapsulated SBC is an expensive procedure which renders the employment of SBC in this form impractical for many applications.

The following prior art references illustrate aspects of the technology of animal litter preparation, and, in particular, disclose the use of clays in such litters.

U.S. Pat. No. 3,765,371 issued Oct. 16, 1973 to Fisher, discloses a foamed plastic for absorbing and/or adsorbing animal waste products and also identifies clay and bentonites as previously used animal litters.

U.S. Pat. Nos. 4,275,684 issued Jun. 30, 1981 and 4,395,357 issued Jul. 26, 1983 to Kramer et al., disclose calcium silicate as an animal litter box absorbent material, and state that clay minerals, e.g. sepiolites, are known litters.

U.S. Pat. No. 4,315,761 issued Feb. 16, 1982 to Larrson et al., teaches the use of aerated or foamed concrete to absorb animal waste products and facilitate the removal of excrement from a litter box, and also discloses that "porous granulates of burnt expanded clay" is known for use as a urine absorbent.

U.S. Pat. No. 4,494,481 issued Jan. 22, 1985 to Rodriguez et al., discloses the addition of a soluble salt of a transition metal from Group Ib or IIb of the Periodic Table to a conventional litter composition to prevent the development of urine odors, and also identifies "clay such as . . . montmorillonites or bentonites" as suitable for use as an animal litter.

U.S. Pat. No. 4,570,573 issued Feb. 18, 1986 to Lohman, discloses an animal litter composition containing 60–94 wt. % of paper, 1–35 wt. % of gypsum, and 3–12% of water, and also states that clay, fuller's earth, and vermiculite are employed in cat litter compositions.

U.S. Pat. No. 4,638,763 issued Jan. 27, 1987 to Greenberg, teaches the addition of sodium sulfate to a litter box absorbent material to facilitate removal of solid absorbent material from the litter box, and teaches that clays such as montmorillonite and hectorite are suitable as absorbent material.

U.S. Pat. No. 4,685,420 issued Aug. 11, 1987 to Stuart, discloses an animal litter composition comprising a water-absorbing polymer such as a polyacryate combined with a porous inert solid substrate such as clay.

U.S. Pat. No. 5,000,115 issued Mar. 19, 1991 to Hughes, discloses the use of a water swellable bentonite clay as an absorbent litter material. The clay absorbs the liquids in animal waste which on contacting the clay agglomerates it into a stable mass easily separated from the unwetted and unsoiled portion of the composition.

Pending application Serial No. 08/056,511, filed May 3, 1993, discloses and claims the deodorizing additive which may be used in the litter compositions of this invention.

Pending application Serial No. 08/056,629, filed May 3, 1993, discloses and claims animal litter compositions containing a water-swellable clay and the deodorizing additive component which may be used in the litter compositions of this invention.

SUMMARY OF THE INVENTION

In accordance with this invention, there is provided an animal litter comprising (1) a particulate water-absorbent clayey component, e.g. a clayey soil or comminuted rock such as a sodium bentonite, containing at least one water-swellable clay mineral, e.g. montmorillonite; and (2) a water-soluble salt of carboxymethylcellulose (CMC). As an optional component, the litter composition may also contain (3) as a deodorizing additive component for the clayey component, a solid particulate composition comprising sodium bicarbonate (SBC) or potassium bicarbonate (KBC), the particles of which are substantially coated with a mineral oil, blended with a powdered siliceous material, e.g., expanded perlite, having a bulk density significantly lower than the density of SBC or KBC, the coated particles of SBC or KBC being stably adhered to and agglomerated with the particles of the siliceous material.

Because of the water swellability of the clay mineral contained in the clayey component and the presence of the CMC salt, the litter tends to form hardened clumps wherever it is contacted with an aqueous liquid such as urine. Moreover such clumps can be easily scooped up from the litter box or cage without removing the portions of the litter which have not been contacted with the urine, and can be disposed of with relatively little disintegration. The improvement in the resistance to disintegration of the clumps formed by the litters of this invention when contacted with an aqueous liquid such as animal urine is apparently due to some unobvious interaction between the water-swellable clay and the CMC salt in the presence of water since the same effect is not necessarily present when a CMC salt is added to a litter composition containing a water absorbent material other than a water-swellable clay.

If the deodorizing additive component is also present in the litter composition, any urine odors which tend to form between removal of the urine containing clumps or due to small clumps or traces of urine which are not removed with the larger clumps, tend to be eliminated or minimized by the SBC or KBC in such additive component. Since the SBC or KBC particles in the deodorizing additive component present in the litters of this invention are largely coated with mineral oil and are agglomerated with the siliceous material, they have little or no tendency to wick and dissolve into the aqueous phase of the animal waste products deposited in the litter. Moreover, the large effect of the mineral oil, due to its capillarity, surface tension and viscosity, in causing the SBC or KBC to adhere to and agglomerate with the lower bulk density siliceous material, results in a reduction of the overall density of the particles containing SBC or KBC in the composition of the deodorizing additive component, so that such density is substantially lower than that of the SBC or KBC itself. Thus, there is a much smaller tendency for the particles of the deodorizing additive component of the litter to sink to the bottom of the litter box or cage containing the litter than there is when pure SBC or KBC is added. The additive component therefore provides means for the SBC or KBC to exert its deodorizing effect while dispersed throughout the litter, even in the presence of a considerable amount of aqueous liquid such as urine.

Due to the necessity for the SBC or KBC in the deodorizing additive component which may be employed in the animal litter of this invention to be thoroughly coated with mineral oil and to be efficiently agglomerated with the particles of siliceous material, the method of preparation of the additive component is somewhat significant. Thus, in most cases, the pure SBC or KBC must be blended with sufficient mineral oil to substantially coat the particles while still maintaining a powdery consistency, and the powder of coated particles is then blended with a powder of the siliceous material to obtain a powder composition composed of stable agglomerates of coated SBC or KBC and siliceous material.

DETAILED DESCRIPTION OF THE INVENTION

As stated, the water-absorbent clayey component of the animal litters of this invention may be, for example, a clayey soil or comminuted rock containing at least one water swellable clay mineral. Such clay mineral may be, for example, a montmorillonoid or smectite, having a three-layer, sheet structure crystal lattice with two layers of silicon/oxygen tetrahedrons between which is a central layer of aluminum and/or magnesium/oxygen dioctahedrons or trioctahedrons. Part of the silicon in the tetrahedral layers may be substituted with aluminum and part of the aluminum and/or magnesium in the central octahedral layer may be substituted with other elements such as lithium, chromium, zinc, or iron. Contemplated montmorillonoid clay minerals are montmorillonite and nontronite containing a dioctahedral central layer, and hectorite, saponite, and sauconite containing a trioctohedral central layer.

When the foregoing montmorillonoid clay minerals are contacted with water or water vapor, the water molecules penetrate between the layers causing interlayer or intracrystalline swelling and expansion of the entire lattice. This causes the particles of clayey component in the animal litter to agglomerate thus facilitating the removal of only that portion of the litter which is swelled by urine or other aqueous waste liquid.

The clayey component may have a particle size in the range, for example, of about 300 to 2500 microns (about 50 to 8 U.S. mesh size), preferably about 420 to 840 microns (about 40 to 20 U.S. mesh size).

The preferred clayey component of the animal litter of the invention is a comminuted bentonite, more preferably a sodium bentonite, which contains a preponderant amount of montmorillonite clay mineral Other clayey components which may be used are the attapulgite clays and/or mixtures of bentonites from various sources.

The base clayey component may be present in an amount, for example, of about 80 to 98 wt. %, preferably about 90 to 95 wt. % based on the weight of the litter composition.

The water-soluble CMC salt contemplated in the litter compositions of this invention is, for example an alkali metal salt, e.g. a sodium or potassium salt, preferably a sodium salt of a CMC having a number average molecular weight of, for example about 200 to 2000, preferably about 700 to 800. The CMC salt may be present in an amount, for example, of about 0.1 to 2.0 wt. %, preferably about 0.25 to 1.0 wt. %, based on the weight of the litter composition.

In general, any commercial grade of SBC or KBC may be used in preparing the deodorizing additive component which may be optionally present in the compositions of this invention. Thus, the particles of SBC or KBC may be within the range of about 20 to 400 U.S. mesh size, preferably about 40 to 140 U.S. mesh size, and may have an SBC or KBC purity of at least about 90 wt. % preferably at least about 99 wt. %. The SBC or KBC is usually present in the deodorizing additive component in an amount of about 80 to 99 wt. % preferably about 95 to 98 wt. %, based on the total weight of the additive component.

Any conventional and available mineral oil may be used in preparing the deodorizing additive component, e.g., those having a density of about 0.830 to 0.905 g/cc. at 15.6° C. and a viscosity of about 3 to 80 centistokes at 40° C. The amount of mineral oil employed is generally in the range of about 0.1 to 2.0 wt. %, preferably about 0.5 to 1.0 wt. % based on the weight of SBC or KBC.

The powdered siliceous material having a bulk density significantly lower than SBC or KBC may be obtained, for example, from a type of glassy igneous rock, e.g., a rhyolitic glass such as perlite, comprising hydrated silica and containing spheroidal and convoluted concentric cracks causing it to break up into small pearlike masses or pebbles. When this type of material is crushed and "expanded," i.e., heated to a temperature above that at which its water of hydration is liberated, it forms particles of thin spherical or ellipsoidal shells and their fragments and other scaly or flaky siliceous particles which may be used in the compositions of this invention. Expanded perlite is the preferred siliceous material for use in this invention.

Other specific siliceous materials which may be utilized in the deodorizing additive component which may be present in the animal litters of this invention are rhyolitic glasses other than perlite and phyllosilicates containing water of hydration, e.g., vermiculite, which have been subjected to expansion. As is the case with perlite, heating these materials to a temperature above that at which their water of hydration is liberated causes them to expand physically to a substantial degree resulting in an appreciable decrease in their bulk density.

The siliceous material, e.g., expanded perlite, utilized in the deodorizing additive component may have a bulk density in the range of, for example, 50 to 300 g/l preferably about 70 to 150 g/l and a particle size, for example, of about 20 to 400 U.S. mesh size, preferably about 50 to 200 U.S. mesh size. It may be present in the deodorizing additive component in an amount, for example, of about 0.5 to 20 wt. %, preferably about 1 to 5 wt. %, based on the weight of the final deodorizing additive component. Within the foregoing ranges, the weight percent of siliceous material in the deodorizing additive component may be adjusted such that the density of the particles in such component is closer to that of the particles of the clayey component of the litter for which the additive is intended than the density of pure SBC or KBC. This has the effect of reducing the tendency of the deodorizing particles to settle to the bottom of the mass of litter in the litter box or cage.

The deodorizing additive component, if utilized, may be present in the litter composition in an amount, for example, of about 2 to 20 wt. %, preferably about 5 to 10 wt. %, based on the weight of the litter composition.

The litter compositions of this invention may also optionally contain a fragrance component. This may be a powdery "fragrance preblend" comprising a pleasant smelling oily liquid or "perfume oil" absorbed on particles of a fragrance carrier having a high surface to volume ratio. The perfume oil may comprise one or more essential or synthetic oils which are well-known in the art as providing a pleasant odor to the composition containing them and also as having the capability of somewhat masking unpleasant odors. The fragrance carrier may be any of a group of siliceous and other materials also well-known in the art as having a high surface to volume ratio and as being able to absorb perfume oils efficiently while maintaining their powdery consistency, e.g., dimorphous silicas or starches. The perfume oil may be present in the fragrance preblend in an amount, for example, of about 25 to 75 wt. % based on the total weight of preblend, and the particle size of fragrance carrier and preblend may be in the range, for example, of 50 to 400 U.S. mesh size. The fragrance preblend may be blended into the litter composition at any point separate from the initial blending of materials making up the deodorizing additive component if such component is utilized, and may be present in the final litter composition in an amount, for example, of about 0.5 to 3.0 wt. % based on the weight of the total composition.

The fragrance may also be utilized in encapsulated form or as a spray dried component.

The litter composition may also optionally contain zinc oxide (ZnO) which exerts a bactericidal action on the waste products in the litter. Since at least some of the foul odors of urine and fecal matter over a period of time is caused by the bacterial breakdown of the components of such matter, the anti-bacterial action of the ZnO results in a reduction of the generation of such odors. If employed, the ZnO may be added separately with the other components in the preparation of the litter or included in the preparation of the deodorizing additive component if such component is employed. The ZnO may be present in an amount, for example, of about 0.1 to 1 wt. % of the litter composition, or about 5 to 10 wt. % of the deodorizing additive component of the ZnO is incorporated in the preparation of such component subsequently used in the litter composition. The ZnO may have a primary (unagglomerated) particle size of about 5 nanometers to 300 microns, preferably about 5 nanometers to 10 microns.

In preparing the deodorizing additive component if such is intended to be utilized in the litter compositions of this invention, the SBC or KBC and mineral oil are separately blended, e.g., by adding the SBC or KBC to a mixer and spraying the mineral oil into the mixer while the SBC or KBC is being agitated. After all the mineral oil is added, the blending procedure may be continued for a period, for example, of about 5 to 20 min. The siliceous material having a relatively low bulk density, e.g., expanded perlite, may then be added to the mixer where it is blended with the SBC or KBC/mineral oil mixture for a period of, for example, about 5 to 20 minutes.

If a fragrance is intended to be present, a fragrance preblend may be separately prepared, e.g., by adding a portion of the fragrance carrier to a mixer, initiating spraying of the perfume oil into the mixer while the remainder of the fragrance carrier is added, and continuing blending until a lump-free consistent powder is obtained. The blending period for preparation of the fragrance preblend may be, for example, about 10 to 60 min.

As stated, the fragrance and/or ZnO, if used, may be incorporated in the litter composition at any point separate from the initial blending of SBC or KBC, mineral oil, and siliceous material in the preparation of the deodorizing additive component if such component is intended to be present in the litter composition. For example, the ZnO and then the fragrance may be added to the mixture of SBC or KBC, mineral oil and siliceous material during the preparation of the deodorizing additive component, and blending continued, e.g., for a period of about 5 to 20 min. for each component, until the final deodorizing additive component is obtained. Alternatively, the CMC salt, fragrance if used, and ZnO if used, may be blended with the clayey component before the latter is blended with the deodorizing additive component if used, or they may be blended with the mixture of clayey component and deodorizing additive component after these two components are blended.

The foregoing blending procedures may be carried out in any conventional equipment intended for the blending of a particulate solid material with other solid materials or liquids. Examples of suitable equipment are ribbon blenders, V-shell blenders, Marion mixers, and Norda mixers.

The litter compositions of this invention may be used for a wide variety of animals and birds, e.g., uncaged household pets such as cats and dogs, particularly puppies too young to be walked, caged pets such as hamsters, gerbils and rabbits, caged laboratory animals such as guinea pigs, mice, rats and monkeys, animals raised for fur such as mink, barnyard birds such as chickens, ducks and geese, and pet birds such as parrots, parakeets, canaries and pigeons.

In addition to the components described previously, the litter composition of this invention may contain other components for various purposes, e.g., disinfectants and colorants.

The compositions of this invention are particularly suitable for use as cat litters.

The invention is further by the following examples. All parts are by weight.

EXAMPLE 1

This example shows the preparation of a litter composition of this invention containing a deodorizing additive component but no fragrance. The deodorizing additive component was first prepared as follows:

Sodium bicarbonate (SBC) having a purity of over 99% and a particle size in the range of about 40 to 140 U.S. mesh size was charged in an amount of 96 parts to a ribbon blender while 0.5 –2.0 parts of mineral oil having a density of about 0.850 g/cc at 15.6° C. and a viscosity of about 12 centistokes at 40° C. was being sprayed into the blender. The charging of the SBC and mineral oil was accomplished in 3½ min. and blending of the two components was continued for another 8 min. Two parts of expanded perlite having a bulk density of about 100 g/l and particle size in the range of about 50 to 200 U.S. mesh size was then added to the blender in the course of 2½ min. and blending was continued for 5 additional minutes.

The foregoing deodorizing additive component is blended with 90 wt. % of comminuted sodium bentonite having a particle size distribution of about 20 to 40 U.S. mesh size, and 1 wt. % of a sodium CMC having a number average molecular weight of about 800.

EXAMPLE 2

This example illustrates the preparation of a litter composition of this invention containing a deodorizing additive composition which in turn contains a fragrance.

A fragrance preblend was prepared by first charging a ribbon blender with 0.3 part of "Sipermat 22" dimorphous silica fragrance carrier and then spraying into the blender 0.6 part of a perfume oil known in the art as having the property of at least partially masking unpleasant odors while adding an additional 0.3 part of fragrance carrier. Blending was continued for one hour from the addition of the perfume oil to obtain a finished fragrance preblend.

The fragrance preblend was then added to the additive composition prepared in another ribbon blender as described in Example 1 and blending was continued for 11 min. to obtain the final deodorizing additive component containing fragrance. The deodorizing additive component is then blended with a base sodium bentonite component and a sodium CMC as described in Example 1.

The litters of both Examples 1 and 2 are particularly suitable as cat litters but can also be used for other animals and birds. However used, the portions of the litter contacted with urine or other waste liquids form agglomerated clumps which can be easily scooped up and separated from the remainder of the litter not contacted with urine and which do not tend to disintegrate before disposal. Furthermore, if the deodorizing additive component is present, the litter does not emit urine or other foul odors between cleanups as readily as other litters which do not contain such component.

We claim:

1. An animal litter composition comprising 1) a particulate water-absorbent, clayey component containing at least one water swellable clay mineral; 2) a water-soluble salt of carboxymethylcellulose CMC; and 3) a solid particulate deodorizing additive component comprising sodium bicarbonate (SBC) or potassium bicarbonate (KBC), the particles of which are substantially coated with a mineral oil, mixed with a powdered siliceous material having a bulk density significantly lower than the density of said SBC or KBC, said coated particles of SBC or KBC being stably adhered to and agglomerated with said particles of siliceous material.

2. The litter composition of claim 1 wherein said clay mineral is a montmorillonoid or smectite.

3. The litter composition of claim 2 wherein said clayey component is a comminuted bentonite and said at least one clay mineral is montmorillonite.

4. The litter composition of claim 3 wherein said bentonite is a sodium bentonite.

5. The composition of claim 1 wherein said CMC salt is a sodium CMC.

6. The composition of claim 1 wherein said CMC salt has a number average molecular weight of about 200 to 2000.

7. The composition of claim 6 wherein said molecular weight is about 700 to 800.

8. The composition of claim 1 containing about 80 to 98 wt. % of said claey component and about 0.1 to 2.0 wt. % of said CMC salt.

9. The composition of claim 1 containing about 90 to 95 wt. % of said clay and about 0.25 to 1.0 wt. % of said CMC salt.

10. The litter composition of claim 1 also containing a fragrance having the property of at least partially masking unpleasant odors.

11. The litter composition of claim 1 wherein said deodorizing additive component comprises sodium bicarbonate.

12. The litter composition of claim 1 wherein said siliceous material is expanded perlite.

13. The litter composition of claim 1 wherein said siliceous material has a bulk density of about 50 to 300 g/l 14. The litter composition of claim 13 wherein said bulk density is about 70 to 150 g/l 15. The litter composition of claim 1 wherein said clayey component is present in an amount of about 80 to 98 wt. %, said CMC salt is present in an amount of about 0.1 to 2.0 wt. % and said deodorizing additive component is present in an amount of about 2 to 20 wt. %, based on the total composition.

16. The litter composition of claim 15 wherein said deodorizing additive component comprises about 80 to 99 wt. % of SBC or KBC, about 0.1 to 2.0 wt. % of mineral oil, and about 0.5 to 20 wt. % of siliceous material, based on the weight of deodorizing component.

17. The litter composition of claim 15 wherein said clayey component is present in an amount of about 90 to 95 wt. %, said CMC salt is present in an amount of about 0.25 to 1.0 wt. %, and said deodorizing additive component is present in an amount of about 5 to 10 wt. % based on the weight of the total composition.

18. The litter composition of claim 17 wherein said deodorizing additive component comprises about 92 to 98 wt. % of SBC or KBC, about 0.5 to 1.0 wt. % of mineral oil, and about 1 to 5 wt. % of siliceous material, based on the weight of deodorizing component.

19. The composition of claim 1 also containing zinc oxide.

20. The composition of claim 19 wherein solid zinc oxide has a primary particle size of about 5 nanometers to 10 microns.

21. A method of preparing an animal litter composition comprising first preparing a solid particulate deodorizing additive component by mixing sodium bicarbonate (SBC) or potassium bicarbonate (KBC) with sufficient mineral oil to substantially coat the particles of SBC or KBC while maintaining a solid particulate consistency, and blending said coated SBC or KBC with a siliceous material having a bulk density substantially lower than the density of said SBC or KBC to produce said solid particulate deodorizing additive component in which said coated SBC or KBC particles are stably adhered to and agglomerated with the particles of said siliceous material, and subsequently blending said deodorizing additive component with a particulate water absorbent clayey component containing at least one water-swellable clay mineral and a water soluble salt of carboxymethylcellulose.

22. The method of claim 21 wherein a powdered fragrance preblend prepared by blending a fragrance carrier with a perfume oil, is incorporated into said litter composition at any point separate from the initial mixing of SBC or KBC, mineral oil and siliceous material in said deodorizing additive component.

* * * * *